(12) United States Patent
Mach et al.

(10) Patent No.: US 8,948,707 B2
(45) Date of Patent: Feb. 3, 2015

(54) DUPLEX FILTER ARRANGEMENTS FOR USE WITH TUNABLE NARROW BAND ANTENNAS HAVING FORWARD AND BACKWARD COMPATIBILITY

(71) Applicant: Motorola Mobility LLC, Libertyville, IL (US)

(72) Inventors: Richard E. Mach, Cary, IL (US); Gregory R. Black, Vernon Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 213 days.

(21) Appl. No.: 13/735,187

(22) Filed: Jan. 7, 2013

(65) Prior Publication Data
US 2014/0194072 A1    Jul. 10, 2014

(51) Int. Cl.
*H04B 1/38* (2006.01)
(52) U.S. Cl.
USPC ............ 455/73; 455/78; 455/83; 455/550.1; 455/107; 455/13.3; 455/63.3; 333/126; 333/133; 343/789; 343/860; 375/219
(58) Field of Classification Search
USPC ........... 455/73, 78, 83, 13.3, 107, 63.3, 550.1
See application file for complete search history.

(56) References Cited

U.S. PATENT DOCUMENTS

| | | | |
|---|---|---|---|
| 5,023,866 A | 6/1991 | De Muro | |
| 5,515,015 A | 5/1996 | Nakata | |
| 7,155,178 B2 * | 12/2006 | Chang et al. | ................. 455/101 |
| 7,443,810 B2 | 10/2008 | Boyle | |
| 7,848,713 B2 * | 12/2010 | Cabanillas et al. | ............. 455/83 |
| 7,899,410 B2 * | 3/2011 | Rakshani et al. | ............... 455/78 |
| 8,145,141 B2 | 3/2012 | Toncich et al. | |
| 8,175,541 B2 * | 5/2012 | Gorbachov | ..................... 455/73 |
| 8,351,874 B2 | 1/2013 | Dent et al. | |
| 8,670,356 B1 * | 3/2014 | Keese et al. | ................... 370/277 |
| 2004/0227584 A1 | 11/2004 | Lee et al. | |
| 2010/0182216 A1 | 7/2010 | Schmidhammer | |

FOREIGN PATENT DOCUMENTS

EP    0828306 A2    3/1998

OTHER PUBLICATIONS

Patent Cooperation Treaty, International Search Report and Written Opinion of the International Searching Authority for International Application No. PCT/US2014/010164, May 9, 2014, 11 pages.

* cited by examiner

*Primary Examiner* — Marceau Milord
(74) *Attorney, Agent, or Firm* — Leydig Voit & Mayer, Ltd.

(57) ABSTRACT

A transceiver module and duplexer within a communication device supports a minimized antenna volume and enhances a transfer gain for transmit and receive channels. The duplexer is communicatively coupled to one of multiple antenna and filter matching configurations which include a first configuration that couples receive and transmit filter matching circuits to a single antenna matching circuit. When the duplexer is coupled to the first configuration, receive and transmit filters of the duplexer are respectively coupled to the receive filter matching circuit and the transmit filter matching circuit. As a result, the antenna matching circuit and the filter matching circuits collectively provide the enhanced transfer gain. The duplexer is placed within an integrated circuit (IC) package to provide a duplexer IC having a specific number of input/output (I/O) pins arranged in a pre-established I/O pin mapping to maintain duplexer functionality and provide compatibility with various antenna and filter matching configurations.

20 Claims, 9 Drawing Sheets

DUPLEX FILTER ARRANGEMENTS FOR USE WITH TUNABLE NARROW BAND ANTENNAS HAVING FORWARD AND BACKWARD COMPATIBILITY

BACKGROUND

1. Technical Field

The present disclosure relates in general to wireless communication devices and in particular to duplex filters in wireless communication devices.

2. Description of the Related Art

In multi-band handset designs, it is desirable to use separate antennas for the receive channel and the transmit channel in a given frequency band, as opposed to conventional or single-band designs in which the receive channel and the transmit channel share an antenna. Narrow bandwidth antennas are desirable because the physical antenna volume can be reduced. Having separate transmit and receive antennas allows utilization of narrower bandwidth antennas. Furthermore, having separate transmit and receive antennas enables the use of narrow bandwidth antennas since a given antenna matching state is utilized to provide good performance for only a transmit channel or a receive channel, during respective intervals. However, when a single shared antenna is utilized for both transmit and receive channels, the antenna's bandwidth must be determined based upon the receive and transmit channels and the guard-band in between the receive and transmit channels. Separate receive and transmit antennas require the use of "split duplexers". In a split duplexer, the receive channel side and the transmit channel side of the duplexer are not connected as in a conventional duplexer but are electrically separated. The split duplexer can be utilized only for a limited number and specific type of transmission modes.

BRIEF DESCRIPTION OF THE DRAWINGS

The described embodiments are to be read in conjunction with the accompanying drawings, wherein.

DETAILED DESCRIPTION

The illustrative embodiments provide, within a communication device, a transceiver module and duplexer system that supports a minimized antenna volume and enhances a transfer gain for transmit and receive channels. A duplexer is communicatively coupled to one of multiple antenna and filter matching configurations which include a first configuration that couples a receive filter matching circuit and a transmit filter matching circuit to a single antenna matching circuit. When the duplexer is coupled to the first configuration, receive and transmit filters of the duplexer are respectively coupled to the receive filter matching circuit and the transmit filter matching circuit. As a result, the antenna matching circuit and the filter matching circuits collectively provide the enhanced transfer gain. The duplexer is placed within an integrated circuit (IC) package to provide a duplexer IC having a specific number of input/output (I/O) pins. The duplexer IC utilizes a pre-established I/O pin mapping to maintain duplexer functionality and provide compatibility with various antenna and filter matching configurations of the communication device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Figure 9:
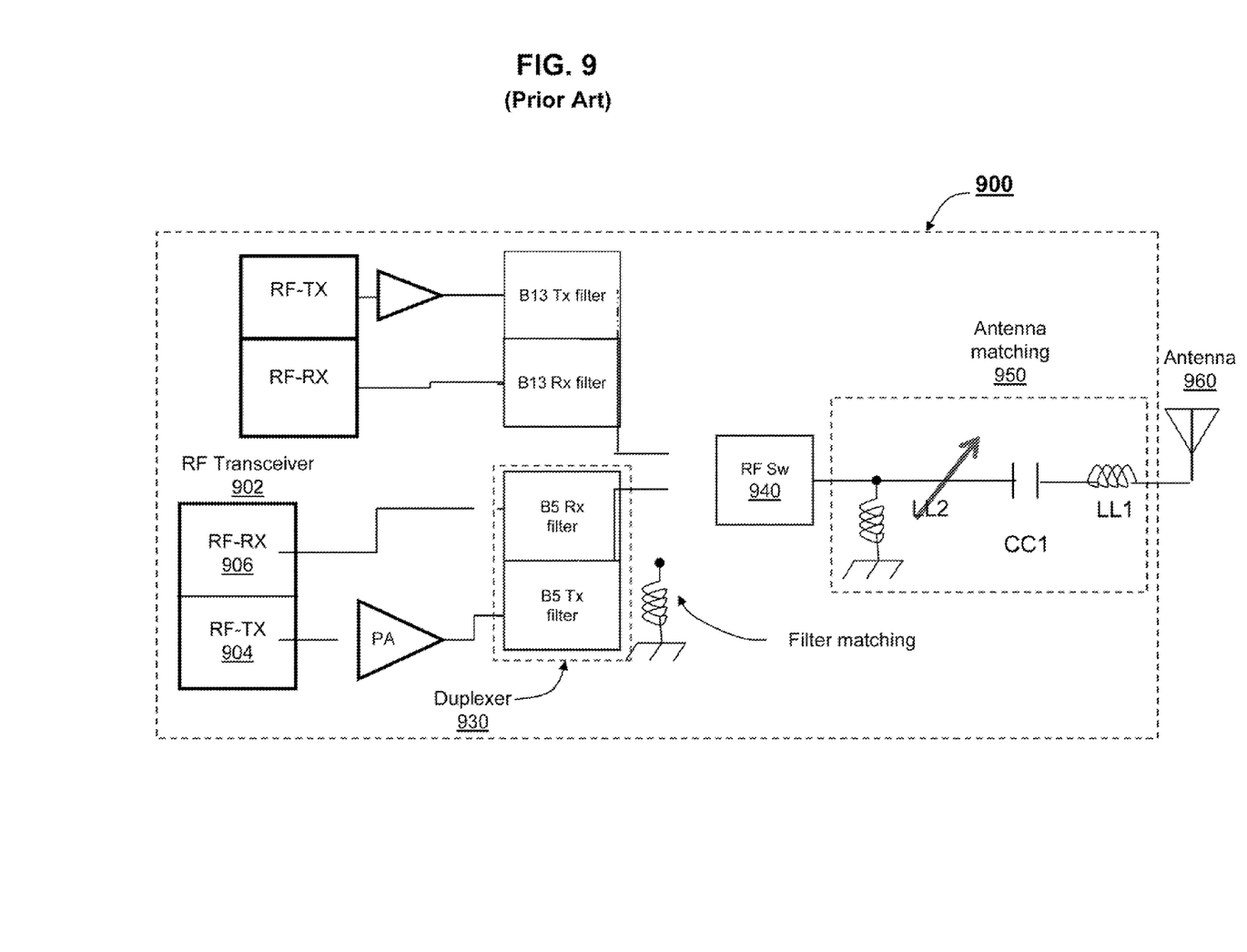
FIG. 9 is a block diagram illustrating a conventional transceiver block comprising a duplexer utilizing a shared filter input/output (I/O) port, according to the prior art.

FIG. 9 is a block diagram illustrating a conventional transceiver block comprising a duplexer utilizing a shared filter input/output (I/O) port, according to the prior art. Transceiver block 900 comprises multiple transceivers including RF transceiver 902 which further comprises RF Tx 904 and RF Rx 906. Transceiver block 900 also comprises duplexer 930 and RF switch 940. In addition, transceiver block 900 comprises antenna matching circuit 950 which is communicatively coupled to antenna 960. As transceiver block 900 illustrates, duplexer 930 utilizes a single shared (I/O) port for receive filter input and transmit filter output.

According to one aspect of the disclosure, the duplexers and duplexer IC configurations presented by the following figures (i.e., FIGS. 1-8) and described hereafter are not limited to this conventional utilization of the single shared (I/O) port, as presented by FIG. 9. As a result of this and other functional distinctions, the duplexer and duplexer IC configurations of the present disclosure achieve significantly better transfer gain performance than conventional systems. Additionally, the design of the disclosed duplexer (e.g., duplexer 214) provides compatibility with the various described configurations, such as the antenna and filter matching circuit configurations of wireless communication device 100 (FIG. 1) and the other configurations presented by the FIGS. 2-8. Additionally, these presented antenna and filter matching circuit configurations maintain enhanced transfer gain performance.

Figure 1:
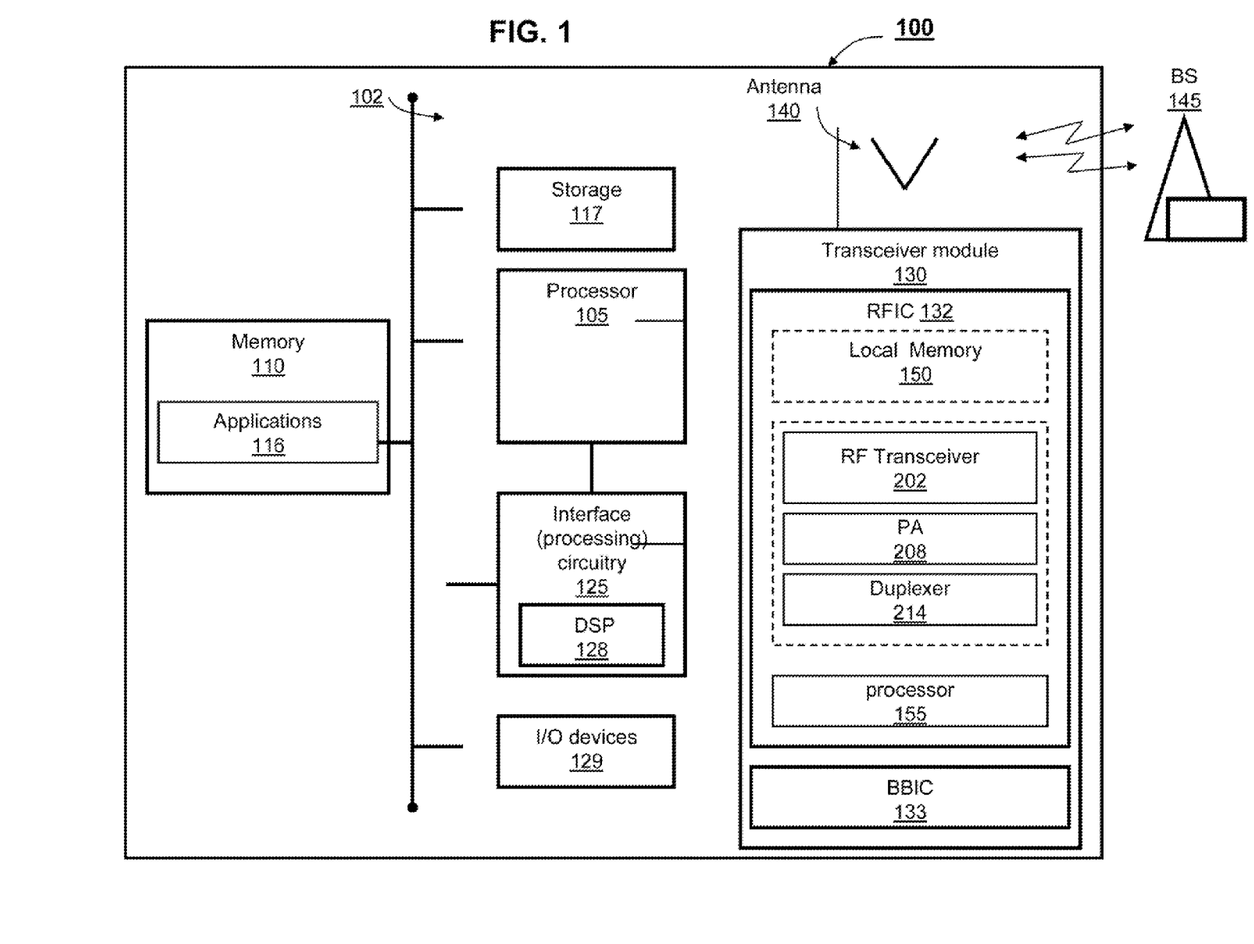
FIG. 1 is a block diagram illustrating an example wireless communication device within which the various features of the described embodiments can be advantageously implemented, according to one embodiment.

With specific reference now to FIG. 1, there is depicted a block diagram of an example wireless communication device 100, within which the functional aspects of the described embodiments may be implemented. Wireless communication device 100 represents a device that is adapted to transmit and receive electromagnetic signals over an air interface via uplink and/or downlink channels between the wireless communication device 100 and communication network equipment (e.g., base-station 145) utilizing a plurality of different communication standards, such as Global System for Mobile Communications (GSM) Code Division Multiple Access (CDMA), Orthogonal Frequency Division Multiple Access (OFDMA), Long Term Evolution (LTE), simultaneous voice and LTE (SVLTE), and similar systems. In one or more embodiments, the wireless communication device 100 can be a mobile cellular device/phone or smart-phone, or laptop, net-book or a tablet computing device, or other types of communications devices. Wireless communication device 100 comprises processor 105 and interface circuitry 125, which are connected to memory component 110 via signal bus 102. Also illustrated in wireless communication device 100 is storage 117. Interface circuitry 125 includes digital signal processor (DSP) 128. Wireless communication device 100 also comprises input/output (I/O) devices 129. Wireless communication device 100 also includes a transceiver module 130 for sending and receiving communication signals. In at least some embodiments, the sending and receiving of communication signals occur wirelessly and are facilitated by one or more antennas 140 coupled to the transceiver module 130. The number of antennas can vary from device to device, ranging from a single antenna to two or more antennas, and the presentation within wireless communication device 100 of one antenna 140 is merely for illustration.

Wireless communication device 100 is able to wirelessly communicate to base-station 145 via antenna 140. Base station 145 can be any one of a number of different types of network stations and/or antennas associated with the infrastructure of the wireless network and configured to support uplink and downlink communication via one or more of the wireless communication protocols, as known by those skilled in the art.

Transceiver module 130 comprises baseband integrated circuit (BBIC) 133 and radio frequency integrated circuit (RFIC) 132. Transceiver module 130 also comprises power amplifier 208, RF transceiver 202, duplexer 214 and other processing block components shown in FIG. 2. In one embodiment, RFIC 132 comprises RF transceiver 202 and local memory 150. In a related embodiment, transceiver module 130 also includes local processor 155, which can be described as a digital signal processor (DSP). According to one aspect of the disclosure, local memory/storage 150 includes therein firmware which supports the various processing functions of transceiver module 130. The structural makeup of transceiver module 130 is described in greater detail in FIG. 2.

In addition to the above described hardware components of wireless communication device 100, various features of the invention may be completed and/or supported via software or firmware code and/or logic stored within at least one of memory 110 and local memory 150, and respectively executed by DSP 128, processor 105, or local processor 155 of transceiver module 130. Thus, for example, illustrated within memory 110 and/or local memory 150 are a number of software/firmware/logic components/modules, including applications 116.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Figure 2:
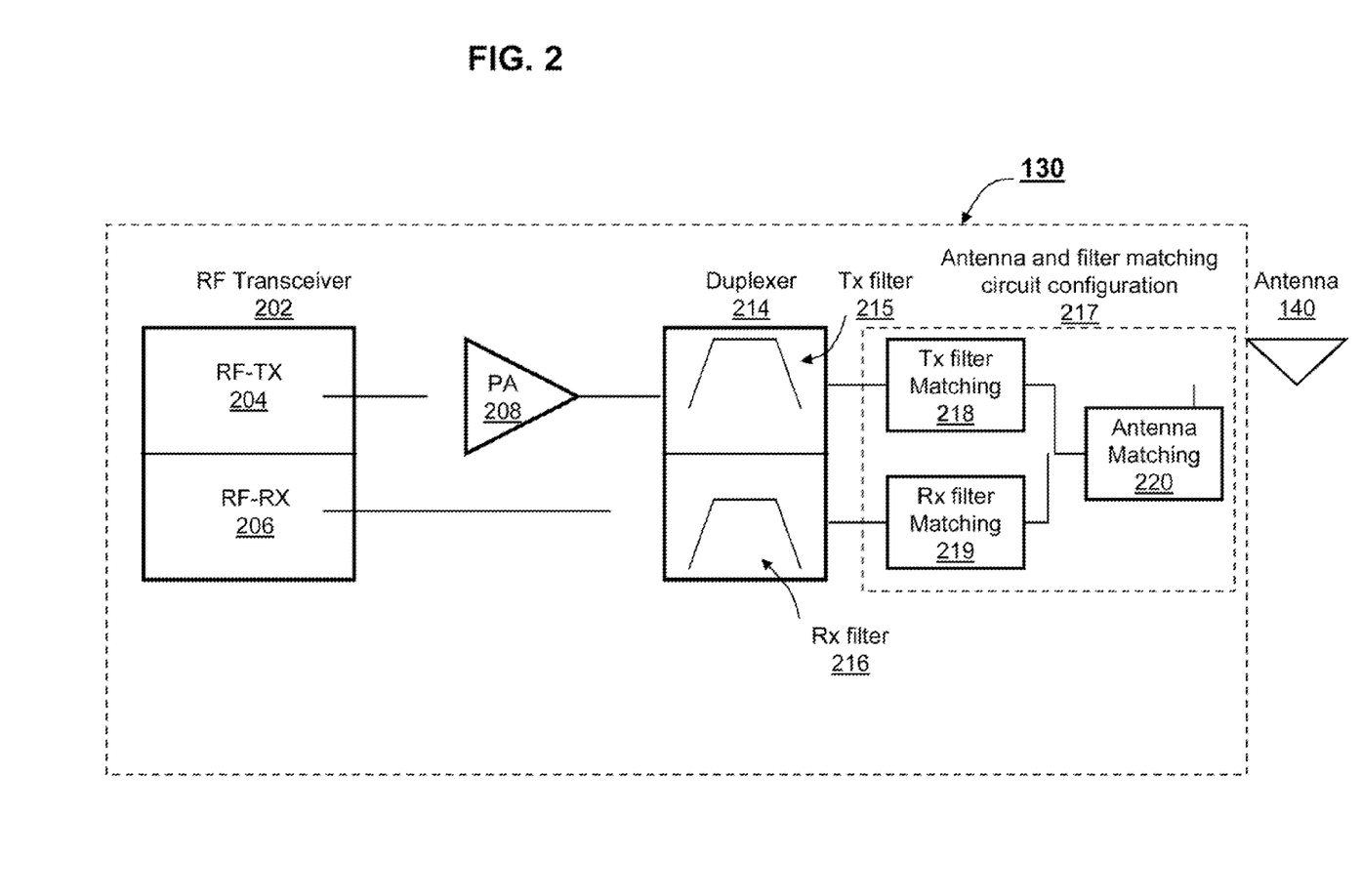
FIG. 2 provides a block diagram representation of a structural configuration of a transceiver module comprising a duplexer which is coupled to a first configuration of multiple possible antenna and filter matching configurations of the wireless communication device, according to one embodiment.

FIG. 2 provides a block diagram representation of a structural configuration of transceiver module 130 comprising a duplexer which is placed within a first configuration from among multiple possible antenna and filter matching configurations that can be utilized within a wireless communication device, according to one embodiment. Transceiver module 130 comprises RF transceiver 202, which includes RF transmitter (TX) 204 and first RF receiver (RX) 206. Transceiver module 130 also comprises power amplifier (PA) 208 and duplexer 214. Duplexer 214 comprises transmit (Tx) filter 215 and receive (Rx) filter 216. Duplexer 214 is coupled by Tx filter 215 to an output port of power amplifier 208. Duplexer 214 is coupled by Rx filter 216 to an input port of RF-RX 206. Transceiver module 130 also comprises an antenna and filter matching circuit configuration, and specifically antenna and filter matching circuit configuration 217. As presented herein, several different antenna and filter matching circuit configurations are defined based on an active transmission mode, active applications, and frequency bands being utilized. The antenna and filter matching circuit configuration 217 represents one of multiple configurations that can be configured within wireless communication device 100. Within the description, this specific antenna and filter matching circuit configuration 217 is a first of several antenna and filter matching circuit configurations and is therefore also referred to as a first configuration 217 to differentiate from the second configuration, third configuration, and so on. Antenna and filter matching circuit configuration 217 comprises transmit filter matching circuit 218 and receive filter matching circuit 219. In addition, antenna and filter matching circuit configuration 217 comprises antenna matching circuit 220, which is and/or performs the function of an antenna tuning circuit. Antenna matching circuit 220 is communicatively coupled to antenna 140.

According to one aspect of the disclosure, the first configuration 217 is specifically coupled to a single antenna that is shared by both or multiple receive and transmit channels. The first configuration provides a shared antenna matching circuit 220 for both transmit and receive channels. However, the first configuration provides a separate or independent filter matching circuit for transmit and receive channels. As shown, transmit filter matching circuit 218 is provided for the transmit channel, and receive filter matching circuit 219 is provided for the receive channel.

As described above, duplexer 214 is communicatively coupled to the first configuration. In the first configuration, an input port of receive filter matching circuit 219 is coupled to an output port of transmit filter matching circuit 218 and these coupled input and output ports are further coupled to a single I/O port of antenna matching circuit 220. Furthermore, with duplexer 214 being coupled to the first configuration, duplexer 214 provides enhanced transfer gain performance. In particular, antenna matching circuit 220, transmit filter matching circuit 218 and receive filter matching circuit 219 collectively enable: (i) a first transfer gain of antenna 140, antenna matching circuit 220, transmit filter matching circuit 218, and transmit filter 215 to be centered on the transmit band, and (ii) a second transfer gain of antenna 140, antenna matching circuit 220, receive filter matching circuit 219, and receive filter 216 to be centered on the receive band. Furthermore, the first transfer gain and second transfer gain have bandwidths less than the duplex spacing of RF transmitter 204 and RF receiver 206.

The figure of merit of an antenna system is the system efficiency, which is the ratio of radiated power to power available from the source. The system efficiency can be expressed in dB units and can be denoted as $\eta_{sys}$:

$$\eta_{sys}=10*\text{Log}_{10}\left[(\text{radiated power})/(\text{Power Available from the Source})\right] \quad 1)$$

The system efficiency has two components: Radiation Efficiency and transfer gain. In dB units, we denote the radiation efficiency as $\eta_{rad}$, and the transfer gain as $G_{match}$.

$$\eta_{sys}=\eta_{rad}+G_{match} \quad 2)$$

The radiation efficiency, $\eta_{rad}$, is a property of the antenna, and the transfer gain, $G_{match}$, is a property of both the antenna and the matching circuit. The transfer gain, $G_{match}$, also referred to as the delivered power, is the ratio of power delivered to the antenna to the power available from the source. $G_{match}$ is the figure of merit for antenna matching:

$$G_{match}=10*\text{Log}_{10}\left[(\text{Power Delivered})/(\text{Power Available from the Source})\right] \quad 3)$$

The transfer gain of a passive matching circuit in dB units is always less than zero. In a well matched antenna it approaches zero. It comprises two loss components, a dissipative loss component and a mismatch loss component. The mismatch component is generally the dominant loss component for narrow band antennas when operating at a band edge. Narrow band antennas generally have a high voltage standing wave ratio (VSWR). Narrow band antennas with high VSWR can be matched at a single frequency, or a narrow range of frequencies, but cannot be well matched over a wide range of frequencies.

A well matched antenna has input impedance (as seen through the matching circuit) substantially equal to the complex conjugate of the source impedance. The degree of matching can be indicated by the return loss. Return loss is a ratio of reflected signal to incident signal. A signal is reflected when a signal source is terminated by an impedance that does not match the impedance of the source. This reflected signal indicates that not all of the power is absorbed by the termination since a portion of the power is lost, due to that portion of the power being reflected back and dissipated in the source.

In one embodiment, first antenna 140 is a narrowband antenna that can support transmit and receive channels which are spaced farther apart than a bandwidth of the narrowband antenna. In one implementation, a duplex spacing of the transmitter and the receiver is greater than a preset percentage X of the bandwidth of at least one of the first transfer gain and the second transfer gain (e.g., X=4). In a related implementation, antenna 140 has a voltage standing wave ratio (VSWR) greater than a preset ratio of a maximum voltage A of a voltage standing wave pattern: minimum voltage B of a voltage standing wave pattern (e.g., A=50 and B=1). The VSWR is a ratio of the maximum to minimum voltage of a voltage standing wave pattern on the transmission line which pattern occurs when a forward (or incident) signal mixes or is combined with a reverse (or reflected) signal.

Figure 3:
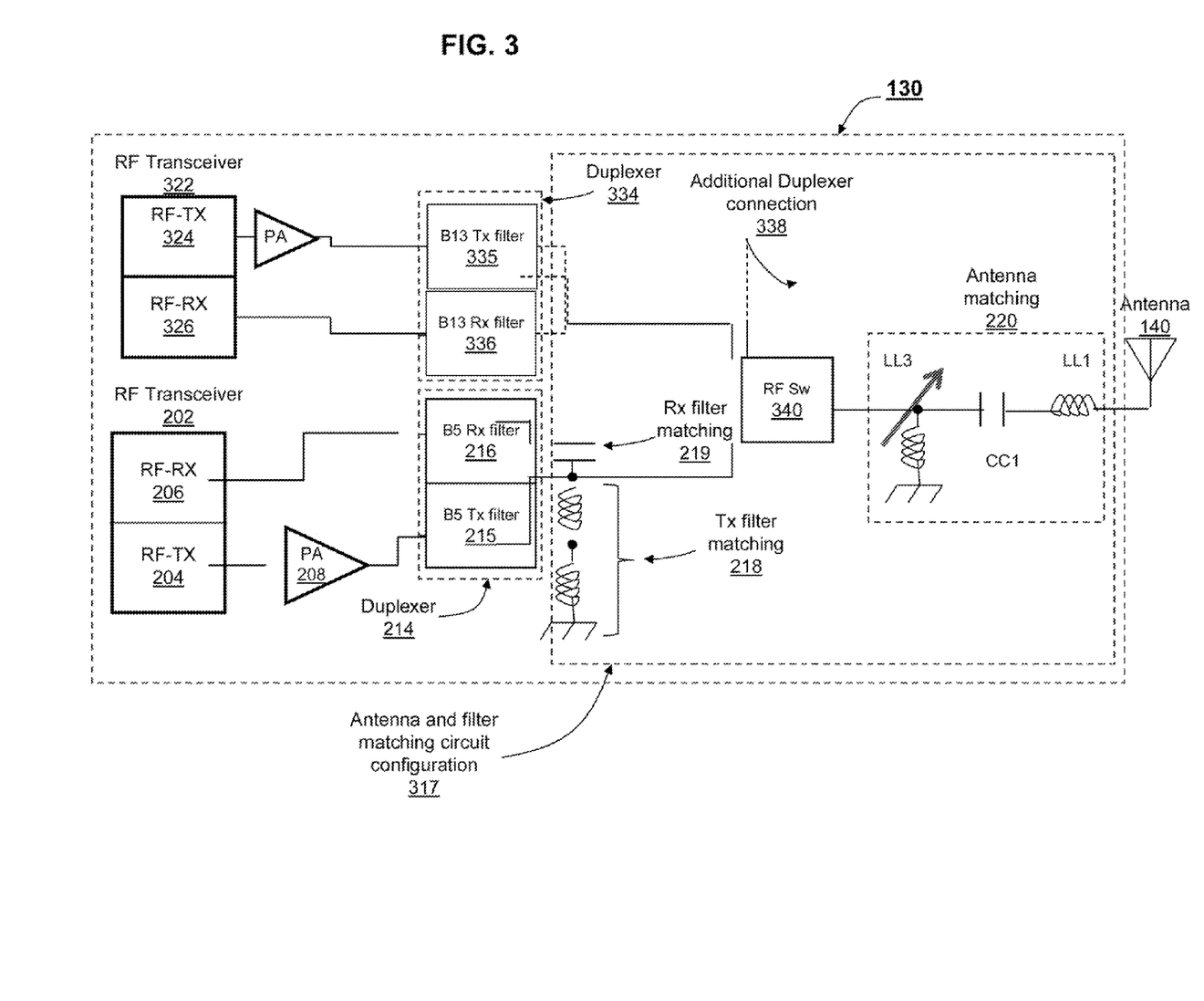
FIG. 3 is a block diagram illustrating a detailed embodiment of the transceiver module comprising a pair of duplexers, which are coupled to an alternative configuration, according to one embodiment.

FIG. 3 provides a more detailed block diagram representation of a structural configuration of transceiver module 130 comprising a pair of duplexers which are coupled to an alternative configuration that is similar to the first configuration within a wireless communication device, according to one embodiment. The alternative configuration is closely related to the first configuration but includes a switch and additional filter matching components. Transceiver module 130 comprises RF transceiver 202, which includes RF transmitter (TX) 204 and first RF receiver (RX) 206. Transceiver module 130 also comprises power amplifier (PA) 208 and duplexer

214. Duplexer 214 comprises Tx filter 215 and Rx filter 216. Duplexer 214 is coupled by Tx filter 215 to an output port of power amplifier 208. Duplexer 214 is coupled by Rx filter 216 to an input port of RF-Rx 206. Transceiver module 130 also comprises the alternative configuration illustrated as antenna and filter matching circuit configuration 317. Antenna and filter matching circuit configuration 317 comprises Tx filter matching circuit 218 and Rx filter matching circuit 219. Also included in antenna and filter matching circuit configuration 317 is RF switch 340. Duplexer 214 is communicatively coupled to RF switch 340 using the Tx filter matching circuit 218 and the Rx filter matching circuit 219. In addition, antenna and filter matching circuit configuration 317 comprises antenna matching circuit 220 which is coupled to RF switch 340. Antenna matching circuit 220 is communicatively coupled to antenna 140.

In one implementation, transmit filter matching circuit 218 comprises multiple inductors. In a related implementation, receive filter matching circuit 219 comprises at least one capacitor. Furthermore, antenna matching circuit 220 comprises a pair of inductors and a tunable capacitor coupled between the pair of inductors.

Transceiver module 130 also comprises RF transceiver 322, which includes RF-TX 324 and RF-RX 326. Transceiver module 130 also comprises duplexer 334 which is utilized with the alternative configuration provided by antenna and filter matching circuit configuration 317 that supports signal propagation utilizing multiple transmitters and/or receivers. Duplexer 334 comprises Tx filter 335 and Rx filter 336. Duplexer 334 is communicatively coupled by Tx filter 335 to RF-TX 324. Duplexer 334 is coupled by Rx filter 336 to an input port of RF-Rx 326. Antenna and filter matching circuit configuration 317 can also comprise a transmit filter matching circuit (not shown) and a receive filter matching circuit (not shown) corresponding to duplexer 334. Duplexer 334 is communicatively coupled to RF switch 340.

RF switch 340 performs frequency band switching of constituent bands of a multi-band communication system. For example, as indicated by the "B5" and "B13" labels within the respective duplex filter names (e.g., "B5 Rx filter"), B5 represents 3$^{rd}$ Generation Partnership Project (3GPP) Band 5 for data communications and/or code division multiple access (CDMA) Band Class 0 (BC0) for voice communications, and B13 represents 3GPP Band 13 for data communications which can include Long Term Evolution (LTE) data communications. Wireless communication device 100 provides simultaneous voice/LTE (SV-LTE) when B5 voice communications and B13 data communications are concurrently provided. In one embodiment, RF switch 340 is able to switch between frequency bands for a multi-band system associated with more than these two frequency bands represented by B5 and B13. As illustrated by additional duplexer connection 338, RF switch 340 can be communicatively connected to other duplexers respectively supporting different frequency bands.

Similar to the first configuration, antenna and filter matching circuit configuration 317 is specifically coupled to a single antenna (i.e., antenna 140) that is shared by both or multiple receive and transmit channels. Antenna and filter matching circuit configuration 317 provides a shared antenna matching circuit 220 for both transmit and receive channels. Antenna and filter matching circuit configuration 317 provides separate or independent filter matching circuits for transmit and receive channels. For example, transmit filter matching circuit 218 is provided for the transmit channel corresponding to RF transceiver 202, and receive filter matching circuit 219 is provided for the receive channel corresponding to RF transceiver 204. Unlike the first configuration, antenna and filter matching circuit configuration 317 provides the functionality of RF switch 340. Furthermore, antenna and filter matching circuit configuration 317 provides multiple transmit filter matching circuits and/or multiple receive filter matching circuits.

As described above, duplexers 214, 334 are communicatively coupled to antenna and filter matching circuit configuration 317. In antenna and filter matching circuit configuration 317, an input port of receive filter matching circuit 219 is coupled to an output port of transmit filter matching circuit 218 and these coupled input and output ports are further coupled via RF switch 340 to a single I/O port of antenna matching circuit 220. With duplexer 214 being coupled to antenna and filter matching circuit configuration 317, antenna matching circuit 220, transmit filter matching circuit 218, and receive filter matching circuit 219 collectively enable: (i) a first transfer gain of antenna 140, antenna matching circuit 220, RF Switch 340, transmit filter matching circuit 218, and transmit filter 215 to be centered on the transmit band, and (ii) a second transfer gain of antenna 140, antenna matching circuit 220, RF Switch 340, receive filter matching circuit 219, and receive filter 216 to be centered on the receive band. Furthermore, the first transfer gain and second transfer gain have bandwidth less than the duplex spacing of RF transmitter 204 and RF receiver 206. The centering of the first and second transfer gain on the transmit and receive bands, respectively, improves the respective transfer gains, which results in improved antenna system efficiency. The transfer gain performance is experienced because the alternative configuration provides separate or independent filter matching circuits for transmit and receive channels, and the receive filter input is not coupled to the transmit filter output port. As shown, filter matching circuit 218 is provided for the transmit channel, and filter matching circuit 219 is provided for the receive channel.

Figure 4:
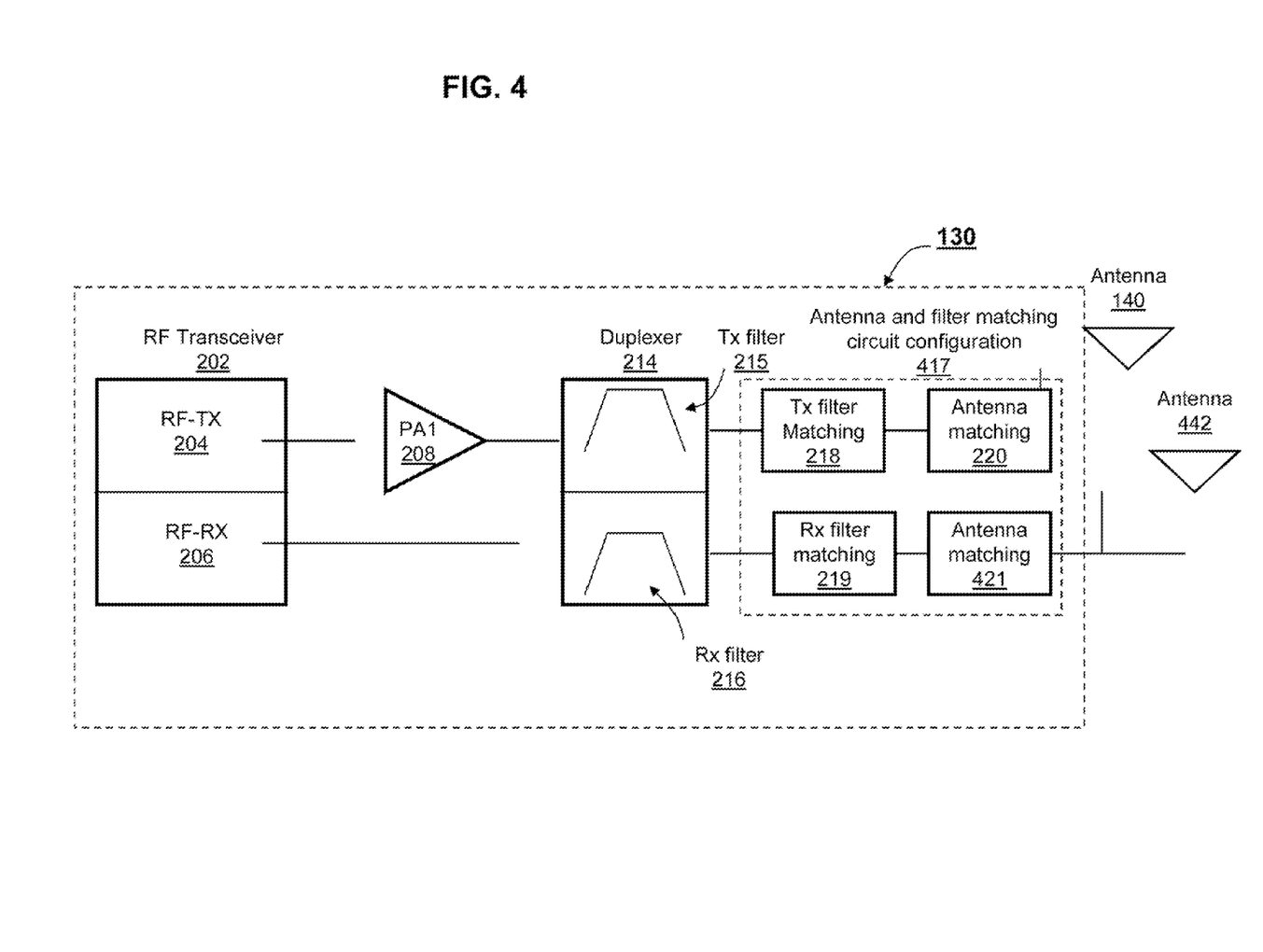
FIG. 4 is a block diagram illustrating an embodiment of the transceiver module 130 comprising a duplexer that is coupled to a second configuration, in accordance with one embodiment.

FIG. 4 is a block diagram illustrating an embodiment of transceiver module 130 comprising duplexer 214 which is coupled to a second antenna and filter matching circuit configuration within wireless communication device 100. Transceiver module 130 comprises RF transceiver 202, which includes RF transmitter (TX) 204 and RF receiver (RX) 206. Transceiver module 130 also comprises power amplifier (PA) 208 and duplexer 214. Duplexer 214 comprises transmit (Tx) filter 215 and receive (Rx) filter 216. Duplexer 214 is coupled by Tx filter 215 to an output port of power amplifier 208. Duplexer 214 is coupled by Rx filter 216 to an input port of RF Rx 206. Transceiver module 130 also comprises a second configuration illustrated as antenna and filter matching circuit configuration 417. Antenna and filter matching circuit configuration 417 comprises transmit filter matching circuit 218 and receive filter matching circuit 219. In addition, antenna and filter matching circuit configuration 417 comprises first antenna matching circuit 220 and second antenna matching circuit 421. First antenna matching circuit 220 is communicatively coupled to first antenna 140. Second antenna matching circuit 421 is communicatively coupled to second antenna 442.

Transmit filter matching circuit 218 is communicatively coupled to RF transmitter 204, and receive filter matching circuit 219 is communicatively coupled to RF receiver 206. First antenna matching circuit 220 is connected to transmit filter matching circuit 218, and second antenna matching circuit 421 is connected to receive filter matching circuit 219. With duplexer 214 coupled to the second configuration, RF transmitter 204 is communicatively coupled to first antenna 140, and RF receiver 206 is communicatively coupled to second antenna 442. RF switches (not shown) can be employed between Rx filter matching circuit 219 and first antenna matching circuit 220, and between Tx filter matching circuit 218 and second antenna matching circuit 421 to couple signals into antenna matching circuits 220 and 421 from other transceivers (not shown).

The second configuration (417) is coupled to a first antenna (e.g., antenna 140) that is utilized by a transmit channel(s) and a second antenna (e.g., antenna 442) that is utilized by a receive channel(s). In addition, the second configuration, provides a first antenna matching circuit 220 for the transmit channel(s) and a second antenna matching circuit 421 for the receive channel(s). In addition, the second configuration provides separate or independent filter matching circuits for transmit and receive channels. In particular, transmit filter matching circuit 218 provides impedance matching for the transmit channel, and receive filter matching circuit 219 provides impedance matching for the receive channel.

With duplexer 214 coupled to the second configuration, first antenna matching circuit 220, second antenna matching circuit 421, transmit filter matching circuit 218, and receive filter matching circuit 219 collectively enable: (i) a first transfer gain of antenna 140, antenna matching circuit 220, transmit filter matching circuit 218, and transmit filter 215 to be centered on the transmit band, and (ii) a second transfer gain of antenna 442, antenna matching circuit 421, receive filter matching circuit 219, and receive filter 216 to be centered on the receive band. The centering of the first and second transfer gain on the transmit and receive bands, respectively, improves the respective transfer gain, which results in improved antenna system efficiency. The transfer gain performance is experienced because the second configuration provides a separate or independent filter matching circuit for transmit and receive channels, and the receive filter input is not coupled to the transmit filter output port. As shown, transmit filter matching circuit 218 is provided for the transmit channel, and receive filter matching circuit 219 is provided for the receive channel.

Figure 5:
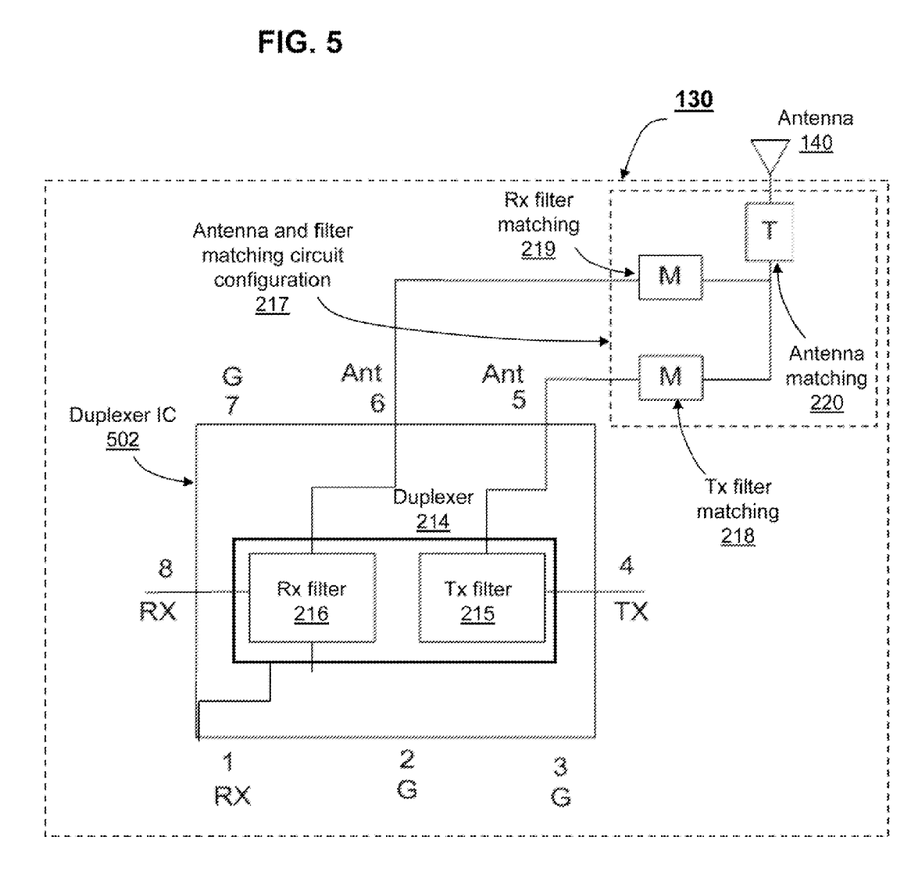
FIG. 5 is a schematic diagram illustrating input/output (I/O) pin arrangement and connectivity within an embodiment of the transceiver module having a duplexer integrated circuit (IC) that includes a duplexer and which is coupled to the first configuration of FIG. 2.

FIG. 5 is a schematic diagram illustrating input/output (I/O) pin arrangement and connectivity within an embodiment of transceiver module 130 comprising a duplexer integrated circuit (IC) 502. Duplexer IC 502 includes duplexer 214 and can be coupled to first antenna and filter matching circuit configuration 217 of wireless communication device 100 (FIG. 1). Antenna and filter matching circuit configuration 217 comprises transmit filter matching circuit 218 and receive filter matching circuit 219. In addition, antenna and filter matching circuit configuration 217 comprises antenna matching circuit 220. Antenna matching circuit 220 is communicatively coupled to antenna 140.

Duplexer IC 502 comprises duplexer 214 which further comprises transmit (Tx) filter 215 and receive (Rx) filter 216. As illustrated, duplexer 214 is placed within an IC package to provide duplexer IC 502. Duplexer IC 502 comprises a plurality of I/O pins 1, 2, 3, 4, 5, 6, 7 and 8. Duplexer IC 502 enables transmit filter 215 to be connected to at least one of a first set of I/O pins and receive filter 216 to be connected to at least one of a second set of I/O pins of duplexer IC 502 by utilizing a pre-established mapping of I/O pins and respective ports of transmit filter 215 and receive filter 216. In particular, an input port of transmit filter 215 is coupled to I/O pin 4 and an output port of transmit filter 215 is coupled to I/O pin 5, which is communicatively coupled to antenna 140. An input port of receive filter 216 is coupled to I/O pin 6, which is communicatively coupled to antenna 140. A first output port of receive filter 216 is coupled to I/O pin 1, and a second output port of receive filter 216 is coupled to I/O pin 8.

Duplexer IC 502 provides at least one connection of a specific I/O pin to an antenna and filter matching circuit configuration and, specifically to a respective filter matching circuit. In particular, I/O pin 5 couples Tx filter 215 to first or transmit filter matching circuit 218, and I/O pin 6 couples Rx filter 216 to second or transmit filter matching circuit 219. I/O pin 4 couples Tx filter 215 to an output port of power amplifier 208 (not shown). I/O pin 1 couples Rx filter 216 to an input port of RF Rx 206 (not shown).

As illustrated, duplexer 214 is placed within an IC package to provide duplexer IC 502 having a specific number of input/output (I/O) pins that are arranged utilizing a pre-established I/O pin mapping to maintain a functionality of duplexer 214 and provide compatibility with various antenna and filter matching circuit configurations of wireless communication device 100 (FIG. 1). By coupling duplexer IC 502 to antenna and filter matching configuration 217 and utilizing I/O pins 5 and 6, duplexer IC 502 is able to couple duplexer 214 to Tx filter matching circuit 218 and receive filter matching circuit 219, respectively. As a result, duplexer IC 502 in FIG. 5 provides an identical duplexer functionality to the duplexer functionality that duplexer 214 provides in FIG. 2.

In general, duplexer IC 502 provides at least one of (a) a first connection of a specific I/O pin to a respective duplex filter (i.e., a receive/transmit filter), (b) a second connection of a specific I/O pin to a respective filter matching circuit, (c) a third connection of a particular I/O pin to a respective antenna matching circuit, and (d) a fourth connection of a first I/O pin to a second I/O pin. The fourth connection is provided external to duplexer IC 502. The receiver filter and the transmit filter represent internal components of duplexer IC 502. A filter matching circuit and an antenna matching circuit represent components external to duplexer IC 502.

Figure 6:
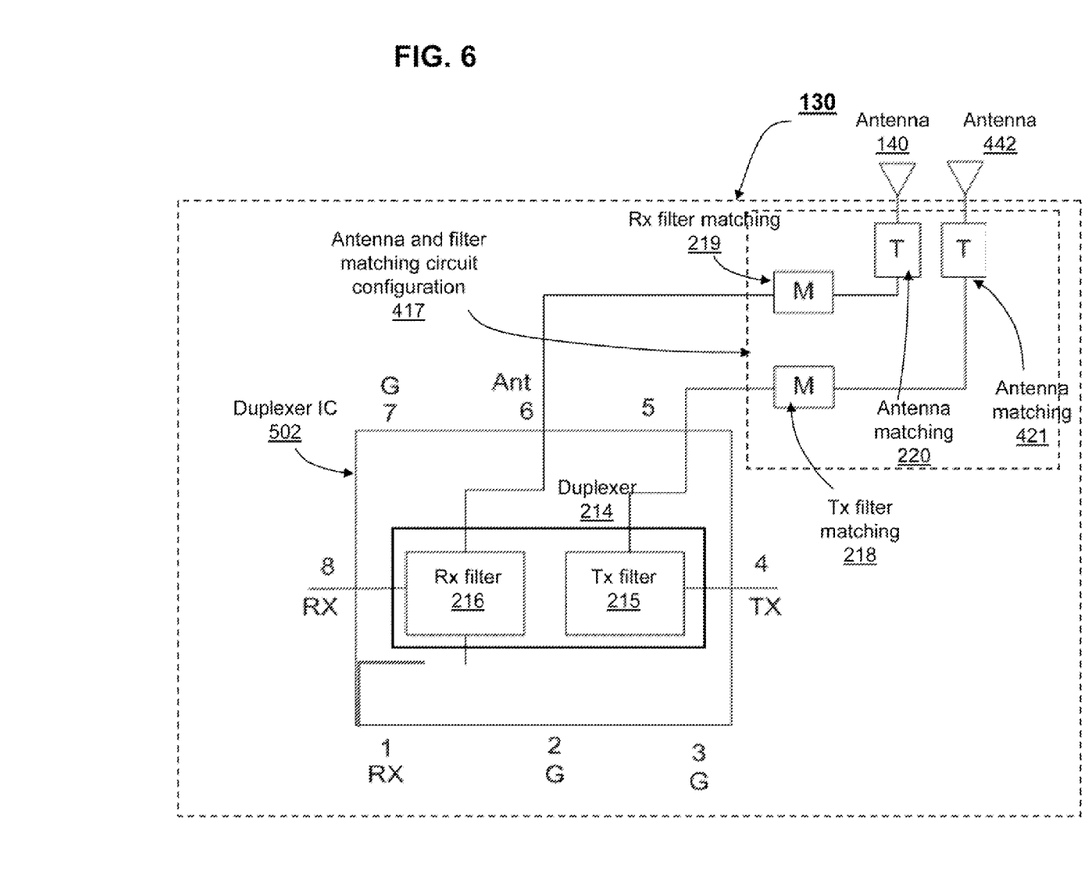
FIG. 6 is a schematic diagram illustrating input/output (I/O) pin arrangement and connectivity within an embodiment of the transceiver module having a duplexer integrated circuit (IC) that includes a duplexer and which is coupled to the second configuration of FIG. 4.

FIG. 6 is a schematic diagram illustrating input/output (I/O) pin arrangement and connectivity within an embodiment of transceiver module 130 comprising duplexer IC 502. Duplexer IC 502 includes duplexer 214 and can be coupled to the second configuration illustrated as antenna and filter matching circuit configuration 417 of wireless communication device 100 (FIG. 1). Antenna and filter matching circuit configuration 417 comprises transmit filter matching circuit 218 and receive filter matching circuit 219. In addition, antenna and filter matching circuit configuration 417 comprises first antenna matching circuit 220 and second antenna matching circuit 421. First antenna matching circuit 220 is communicatively coupled to first antenna 140. Second antenna matching circuit 421 is communicatively coupled to second antenna 442.

Duplexer IC 502 comprises duplexer 214 which further comprises transmit (Tx) filter 215 and receive (Rx) filter 216. As illustrated, duplexer 214 is placed within an IC package to provide duplexer IC 502. Duplexer IC 502 comprises a plurality of I/O pins 1, 2, 3, 4, 5, 6, 7 and 8. Duplexer IC 502 enables transmit filter 215 to be connected to at least one of a first set of I/O pins and receive filter 216 to be connected to at least one of a second set of I/O pins of duplexer IC 502 by utilizing a pre-established mapping of I/O pins and respective ports of transmit filter 215 and receive filter 216. For example, a mapping is I/O pins and respective filter ports are established during system design based on knowledge of circuit components and connectivity of various antenna and filter matching configurations with which a duplexer IC (e.g., duplexer IC 502) is designed to be utilized. Based on the I/O pin mapping, an input port of transmit filter 215 is coupled to I/O pin 4 and an output port of transmit filter 215 is coupled to I/O pin 5 which is communicatively coupled to antenna 140. An input port of receive filter 216 is coupled to I/O pin 6 which is communicatively coupled to antenna 140. A first output port of receive filter 216 is coupled to I/O pin 1, and a second output port of receive filter 216 is coupled to I/O pin 8. Duplexer IC 502 provides at least one connection of a specific I/O pin to a respective filter matching circuit. In particular, I/O pin 5 couples Tx filter 215 to a first matching circuit, transmit filter matching circuit 218, and I/O pin 6 couples Rx filter 216 to a second matching circuit, receive filter matching circuit 219. I/O pin 4 couples Tx filter 215 to an output port of power amplifier 208 (not shown). I/O pin 1 couples Rx filter 216 to an input port of RF Rx 206 (not shown).

As illustrated, duplexer IC 502 is configured with a pre-established I/O pin mapping to maintain a functionality of duplexer 214 and provide compatibility with various antenna and filter matching circuit configurations of wireless communication device 100 (FIG. 1).

Figure 7:
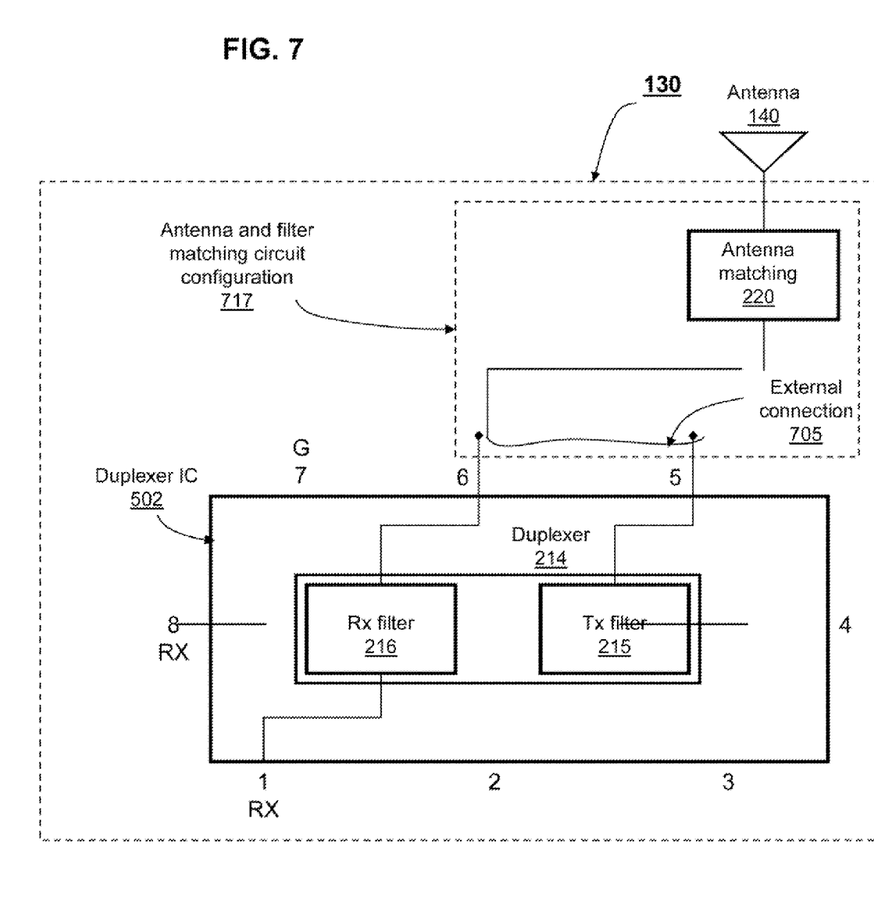
FIG. 7 is a schematic diagram illustrating input/output (I/O) pin arrangement and connectivity within an embodiment of the transceiver module having a duplexer integrated circuit (IC) that includes a duplexer and which is coupled to a third configuration.

FIG. 7 is a schematic diagram illustrating input/output (I/O) pin arrangement and connectivity within an embodiment of transceiver module 130 comprising a duplexer integrated circuit (IC) 502. Duplexer IC 502 includes duplexer 214 and can be coupled to a third configuration provided by antenna and filter matching circuit configuration 717 of wireless communication device 100 (FIG. 1). Antenna and filter matching circuit configuration 717 comprises antenna matching circuit 220. Antenna matching circuit 220 is communicatively coupled to antenna 140.

Duplexer IC 502 comprises duplexer 214 which further comprises transmit (Tx) filter 215 and receive (Rx) filter 216. As illustrated, duplexer 214 is placed within an IC package to provide duplexer IC 502. As illustrated, duplexer IC 502 comprises a plurality of I/O pins 1, 2, 3, 4, 5, 6, 7 and 8 to enable duplexer IC 502 to provide connections for components within duplexer IC 502 and other components external to duplexer IC 502. As illustrated, transmit filter 215 is coupled by an input port (of transmit filter 215) to I/O pin 4 and by an output port to I/O pin 5. Receive filter 216 is coupled via an input port to I/O pin 6, which is communicatively coupled to antenna 140. Receive filter 216 is coupled via a first output port to I/O pin 1. In addition, receive filter 216 is coupled via a second output port of receive filter 216 to I/O pin 8. I/O pin 4 couples Tx filter 215 to an output port of power amplifier 208 (not shown), and power amplifier 208 is coupled to an output port of RF Tx 204 (not shown). I/O pin 1 couples Rx filter 216 to an input port of RF Rx 206 (not shown).

Duplexer IC 502 couples at least one particular I/O pin to a respective antenna matching circuit. For example, duplexer IC 502 couples at I/O pin 6 to antenna matching circuit 220. In addition, duplexer IC 502 enables a first I/O pin to be coupled to a second I/O pin via a connection that is located external to duplexer IC 502. For example, I/O pin 5 is coupled to I/O pin 6 by external connection 705. When duplexer IC 502 is utilized with external connection 705, duplexer IC 502 couples I/O pin 5 to antenna matching circuit 220. As a result, duplexer IC 502 can be utilized to provide a duplexer that is coupled to an antenna and filter matching circuit configuration that enables a transmitter and a receiver to share a single antenna and a single antenna matching circuit component to support concurrent propagation of corresponding receive and transmit signals. External connection 705 utilized with duplexer IC 502 also enables duplexer IC 502 to be backward compatible or exchangeable with conventional duplexer designs. As shown by the descriptions and illustrations of FIGS. 5-7, duplexer IC 502 is capable of being utilized with multiple different antenna and filter matching configurations. As a result, component costs decrease as a single duplexer IC package can be utilized for various configurations.

Figure 8:
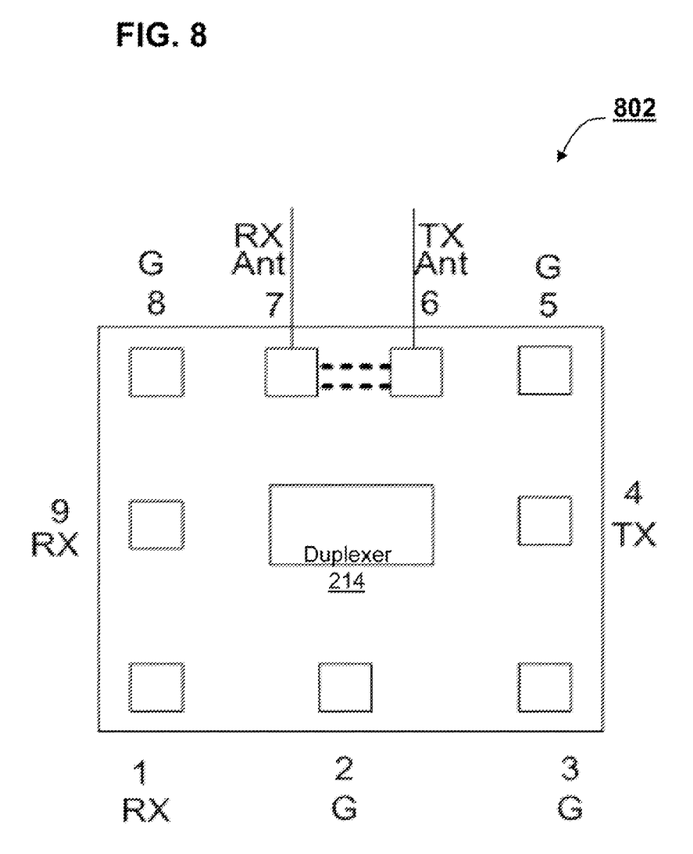
FIG. 8 is a schematic diagram illustrating input/output (I/O) pin arrangement and connectivity within an embodiment of a duplexer IC that includes the duplexer, in accordance with one embodiment.

FIG. 8 is a schematic diagram illustrating an embodiment of a duplexer IC 802 that includes duplexer 214. In duplexer IC 802, the input port of receive filter 216 (not shown) and the output port of transmit filter 215 (not shown) are coupled to I/O pins 7 and 6 respectively. While the I/O pin numbers of FIGS. 5 and 8 are different, relative and adjacent circuit positions of I/O pins that access duplexer functionality are substantially identical. Furthermore, the ability of the I/O pins to provide respective connections for antenna and filter matching configurations to transmit and receive filters remains unchanged. In one implementation, the different I/O pin numbers are a result of providing additional I/O pin connections such as an additional ground connection via the duplexer IC. As illustrated by the variation provided in FIG. 8, the duplexer IC is not limited to one particular I/O pin numbering methodology. Duplexer IC 802 may be implemented within a transceiver module as an alternative to duplexer IC 502 (FIGS. 5-7). Duplexer IC 802 represents a variation in IC package design, particularly I/O pin count and I/O pin mapping. In particular, compared with duplexer IC 502, duplexer IC 802 includes one additional I/O pin and remains compatible for implementation in FIGS. 5-7 as an alternative to duplexer IC 502. For example, as an alternative to duplexer IC 502 in FIG. 7, duplexer IC 802 can replace duplexer IC 502 and can be utilized with an external connection that connects I/O pins 7 and 6 on a corresponding printed circuit board (PCB). In an alternative configuration in which duplexer IC 802 replaces duplexer IC 502 of FIG. 7, antenna matching circuit 220 is coupled to I/O pin 7. Furthermore, in the alternative configuration, I/O pin 9 (of duplexer IC 802) as opposed to I/O pin 8 of duplexer IC 502 (FIG. 7) is coupled to a receive filter output port.

The block diagrams in the various figures presented and described herein illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and combinations of blocks in the block diagrams can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A transceiver module for use within a wireless communication device having at least one antenna, the transceiver module comprising:
    at least one transceiver having a receiver and a transmitter that respectively enable the device to transmit in a transmit band and to receive in a receive band;
    at least one antenna matching circuit including a first antenna matching circuit connected to a first antenna of the at least one antenna;
    a duplexer comprising a receive filter and a transmit filter and which is coupled to one of multiple antenna and filter matching circuit configurations that includes a first configuration which couples to the first antenna and connects (a) an input port of the receive filter to a receive filter matching circuit and (b) an output port of the transmit filter to a transmit filter matching circuit;
    wherein when the duplexer is coupled to the first configuration, the duplexer enables:
        (i) a first transfer gain of the first antenna, the first antenna matching, the transmit filter matching circuit, and the transmit filter to be centered on the transmit band; and
        (ii) a second transfer gain of the first antenna, the first antenna matching, the receive filter matching circuit and the receive filter to be centered on the receive band; and
    wherein the first transfer gain and second transfer gain have bandwidth less than the duplex spacing of the transmitter and the receiver.

2. The transceiver module of claim 1, wherein:
    the duplexer is coupled to the first antenna and filter matching circuit configuration in which:
        the transmit filter matching circuit is communicatively coupled to the transmitter;
        the receive filter matching circuit is communicatively coupled to the receiver;
        the first antenna matching circuit is connected to the receive filter matching circuit and to the transmit filter matching circuit;
    a receive signal path and a transmit signal path are communicatively coupled to the first antenna;
    the receiver matching circuit provides a first impedance matching for the receive channel;
    the transmit filter matching circuit provides a second impedance matching for the transmit channel; and
    the antenna matching circuit provides antenna tuning to concurrently support signal propagation for a receive signal corresponding to the receive channel and a transmit signal corresponding to the transmit channel.

3. The transceiver module of claim 2, wherein:
    the at least one antenna comprises a narrowband antenna that can support transmit and receive channels which are spaced farther apart than a bandwidth of the narrowband antenna.

4. The transceiver module of claim 3, wherein:
    the antenna has a voltage standing wave ratio (VSWR) greater than a preset ratio of a maximum voltage A of a voltage standing wave pattern: minimum voltage B of a voltage standing wave pattern; and
    the duplex spacing of the transmitter and the receiver is greater than a preset percentage X of the bandwidth of at least one of the first transfer gain and the second transfer gain.

5. The transceiver module of claim 4, wherein:
A is substantially equal to 10;
B is substantially equal to 1; and
X is substantially equal to 4.

6. The transceiver module of claim 1, wherein:
    the wireless communication device provides a second configuration coupled to two antennas and the duplexer is coupled to the second configuration in which:
        the at least one antenna matching circuit includes a second antenna matching circuit which is connected to a second antenna of the at least one antenna; and
        the first antenna matching circuit is connected to the transmit filter matching circuit and the second antenna matching circuit is connected to the receive filter matching circuit;
    the transmit filter matching circuit is communicatively coupled to the transmitter;
    the receive filter matching circuit is communicatively coupled to the receiver; and
    the transmitter is communicatively coupled to the first antenna and the receiver is communicatively coupled to the second antenna.

7. The transceiver module of claim 6, wherein:
    the receiver matching circuit provides a first impedance matching for the receive channel;
    the transmitter matching circuit provides a second impedance matching for the transmit channel;

the first antenna matching circuit provides a first antenna tuning for the first antenna; and the second antenna matching circuit provides a second antenna tuning for the second antenna.

8. The transceiver module of claim 7, wherein:
the first antenna matching circuit, the second antenna matching circuit, the transmit filter matching circuit and the receive filter matching circuit collectively enable: (i) a transfer gain of the first antenna, the first antenna matching circuit, the transmit filter matching circuit, and the transmit filter to be centered on the transmit band; and (ii) a transfer gain of the second antenna, the second antenna matching circuit, the receive filter matching circuit, and the receive filter to be centered on the receive band.

9. The transceiver module of claim 1, wherein:
the duplexer is coupled to a third configuration that couples (a) an input port of the receive filter to an input/output (I/O) port of the first antenna matching circuit and (b) an output port of the transmit filter to the I/O port of the first antenna matching circuit;
the receive signal and the transmit signal share the first antenna; and
said third configuration provides a connection between an input port of the receive filter and an output port of the transmit filter, wherein said connection couples the input port of the receive filter and the output port of the transmit filter to the I/O port of the first antenna matching circuit.

10. The transceiver module of claim 1, wherein:
the duplexer is placed within an integrated circuit (IC) package to provide a duplexer IC having a specific number of input/output (I/O) pins that are arranged utilizing a pre-established I/O pin mapping to maintain a functionality of the duplexer and provide compatibility with various filter matching and antenna matching circuit configurations of the communication device, wherein the duplexer IC enables the transmit filter to be connected by at least one of a first set of I/O pins to a first number of components and the receive filter to be connected by at least one of a second set of I/O pins to a second number of components by an arrangement of a pre-established mapping of I/O pins and respective ports of the transmit filter and the receive filter; and
the duplexer IC provides at least one of (a) a first connection of a specific I/O pin to a respective filter matching circuit, (b) a second connection of a particular I/O pin to a respective antenna matching circuit, and (c) a third connection of a first I/O pin to a second I/O pin, wherein said third connection occurs external to the duplexer IC.

11. A wireless communication device having a transceiver module coupled to at least one antenna and which includes:
at least one processor;
at least one transceiver having a receiver and a transmitter that respectively enable the device to transmit in a transmit band and to receive in a receive band;
at least one antenna matching circuit including a first antenna matching circuit connected to a first antenna of the at least one antenna;
a duplexer comprising a receive filter and a transmit filter and which is coupled to one of multiple antenna and filter matching circuit configurations that includes a first configuration which couples to the first antenna and connects (a) an input port of the receive filter to a receive filter matching circuit and (b) an output port of the transmit filter to a transmit filter matching circuit;
wherein when the duplexer is coupled to the first configuration, the duplexer enables:
(i) a first transfer gain of the first antenna, the first antenna matching, the transmit filter matching circuit, and the transmit filter to be centered on the transmit band; and
(ii) a second transfer gain of the first antenna, the first antenna matching, the receive filter matching circuit and the receive filter to be centered on the receive band; and
wherein the first transfer gain and second transfer gain have bandwidth less than the duplex spacing of the transmitter and the receiver.

12. The wireless communication device of claim 11, wherein:
the duplexer is coupled to the first antenna and filter matching circuit configuration in which:
the transmit filter matching circuit is communicatively coupled to the transmitter;
the receive filter matching circuit is communicatively coupled to the receiver; and
the first antenna matching circuit is connected to the receive filter matching circuit and to the transmit filter matching circuit;
a receive signal path and a transmit signal path are communicatively coupled to the first antenna;
the receiver matching circuit provides a first impedance matching for the receive channel;
the transmit filter matching circuit provides a second impedance matching for the transmit channel; and
the antenna matching circuit provides antenna tuning to concurrently support signal propagation for a receive signal corresponding to the receive channel and a transmit signal corresponding to the transmit channel.

13. The wireless communication device of claim 12, wherein:
the at least one antenna comprises a narrowband antenna that can support transmit and receive channels which are spaced farther apart than a bandwidth of the narrowband antenna.

14. The wireless communication device of claim 13, wherein:
the antenna has a voltage standing wave ratio (VSWR) greater than a preset ratio of a maximum voltage A of a voltage standing wave pattern: minimum voltage B of a voltage standing wave pattern; and
the duplex spacing of the transmitter and the receiver is greater than a preset percentage X of the bandwidth of at least one of the first transfer gain and the second transfer gain.

15. The wireless communication device of claim 14, wherein:
A is substantially equal to 10;
B is substantially equal to 1; and
X is substantially equal to 4.

16. The wireless communication device of claim 11, wherein:
the wireless communication device provides a second configuration coupled to two antennas and the duplexer is coupled to the second configuration in which:
the at least one antenna matching circuit includes a second antenna matching circuit which is connected to a second antenna of the at least one antenna; and
the first antenna matching circuit is connected to the transmit filter matching circuit and the second antenna matching circuit is connected to the receive filter matching circuit;

the transmit filter matching circuit is communicatively coupled to the transmitter;

the receive filter matching circuit is communicatively coupled to the receiver; and the transmitter is communicatively coupled to the first antenna and the receiver is communicatively coupled to the second antenna.

17. The wireless communication device of claim 16, wherein:

the receiver matching circuit provides a first impedance matching for the receive channel;

the transmitter matching circuit provides a second impedance matching for the transmit channel;

the first antenna matching circuit provides a first antenna tuning for the first antenna; and the second antenna matching circuit provides a second antenna tuning for the second antenna.

18. The wireless communication device of claim 17, wherein:

the first antenna matching circuit, the second antenna matching circuit, the transmit filter matching circuit and the receive filter matching circuit collectively enable: (i) a transfer gain of the first antenna, the first antenna matching circuit, the transmit filter matching circuit, and the transmit filter to be centered on the transmit band; and (ii) a transfer gain of the second antenna, the second antenna matching circuit, the receive filter matching circuit, and the receive filter to be centered on the receive band.

19. The wireless communication device of claim 11, wherein:

the duplexer is coupled to a third configuration that couples (a) an input port of the receive filter to an input/output (I/O) port of the first antenna matching circuit and (b) an output port of the transmit filter to the I/O port of the first antenna matching circuit;

the receive signal and the transmit signal share the first antenna; and said third configuration provides a connection between an input port of the receive filter and an output port of the transmit filter, wherein said connection couples the input port of the receive filter and the output port of the transmit filter to the I/O port of the first antenna matching circuit.

20. The wireless communication device of claim 11, wherein:

the duplexer is placed within an integrated circuit (IC) package to provide a duplexer IC having a specific number of input/output (I/O) pins that are arranged utilizing a pre-established I/O pin mapping to maintain a functionality of the duplexer and provide compatibility with various filter matching and antenna matching circuit configurations of the communication device, wherein the duplexer IC enables the transmit filter to be connected by at least one of a first set of I/O pins to a first number of components and the receive filter to be connected by at least one of a second set of I/O pins to a second number of components by an arrangement of a pre-established mapping of I/O pins and respective ports of the transmit filter and the receive filter; and the duplexer IC provides at least one of (a) a first connection of a specific I/O pin to a respective filter matching circuit, (b) a second connection of a particular I/O pin to a respective antenna matching circuit, and (c) a third connection of a first I/O pin to a second I/O pin, wherein said third connection occurs external to the duplexer IC.

* * * * *